April 26, 1966   J. F. FERRANTE   3,248,619
METALLIZED-ELECTRODE CAPACITOR CONSTRUCTION
Filed June 26, 1964   3 Sheets-Sheet 1

INVENTOR.
JOSEPH F. FERRANTE
BY
ATTORNEY

April 26, 1966     J. F. FERRANTE     3,248,619
METALLIZED-ELECTRODE CAPACITOR CONSTRUCTION
Filed June 26, 1964     3 Sheets-Sheet 2
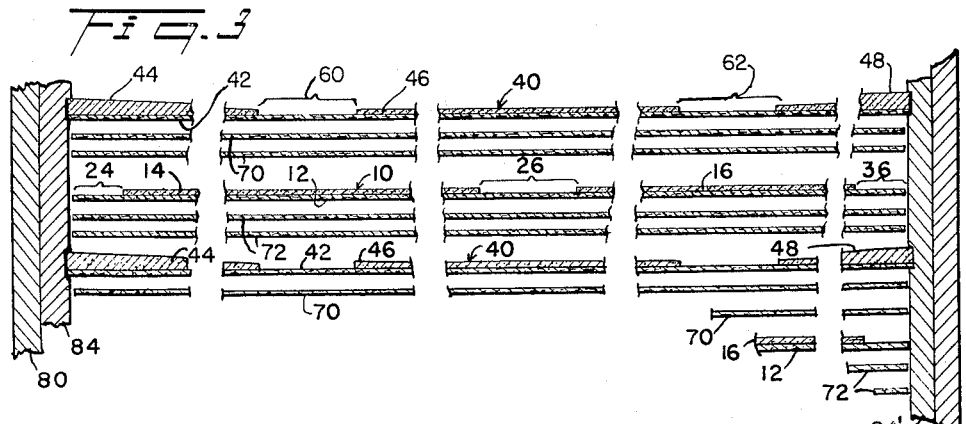
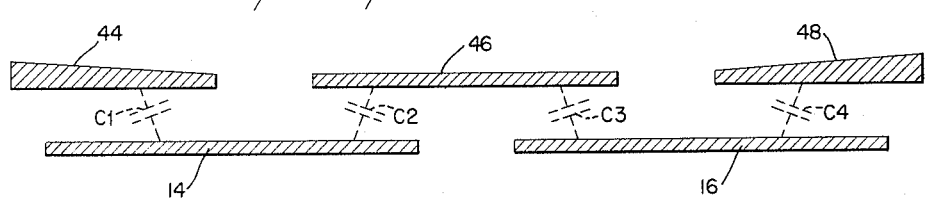
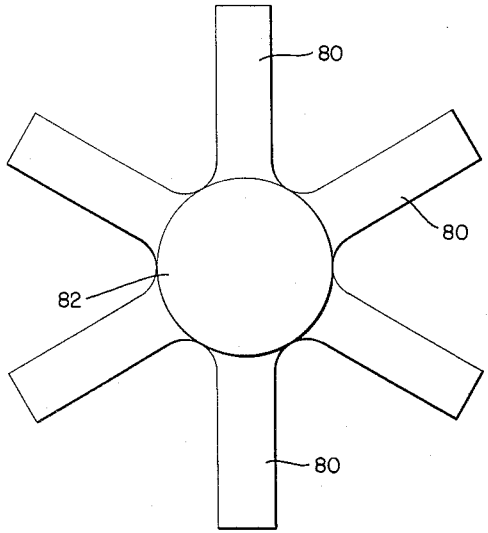
*INVENTOR.*
JOSEPH F. FERRANTE
BY
ATTORNEY

INVENTOR
JOSEPH F. FERRANTE

BY *Paul S. Martin*

ATTORNEY

United States Patent Office 3,248,619
Patented Apr. 26, 1966

3,248,619
METALLIZED-ELECTRODE CAPACITOR
CONSTRUCTION
Joseph F. Ferrante, 20 Old Stone Road, Westwood, Mass.
Filed June 26, 1964, Ser. No. 380,979
4 Claims. (Cl. 317—260)

This application is a continuation-in-part of my pending application Serial No. 859,273 filed December 14, 1959, now abandoned.

This invention relates to electrical capacitors and particularly to an improved construction for fast discharge high energy storage capacitors.

Recent high temperature research activities in association with controlled thermonuclear reaction investigations and related experimentation have required utilization of large banks of energy storage capacitors, often totaling upwards of 10 megajoules, which are adapted to be charged to a relatively high voltage and rapidly discharged to provide peak magnetic fields at a load. In such installations it is necessary that the energy storage system have fast discharge properties and be free from the danger of destructive explosions that may result from capacitor breakdown. Conventionally constructed capacitors do not fully satisfy these requirements and must be provided with auxiliary protective devices, such as fuses, in order to provide for the necessary fault protection. One of the problems that has impeded, if not actually effectively halted, rapid advance in this field is the unavoidable and undesired slowing down of the rate of condenser discharge and consequent reduction in the peak magnetic fields producible thereby by the inductance introduced into the circuit by the necessary utilization of protective fuses. Apart from the undesired slowing down of the discharge rate, another problem faced in such installations is the basic unreliability of protective fuses in systems where the fault current is in excess of 60,000 amperes. Attempts have been made to resolve the above stated mutually contradictory requirements by development of more reliable protective fuses, but whatever limited success has been achieved to date as to improved fuse reliability has been at the expense of added circuit inductance and resistance and has resulted in further undesired slowing down of the discharge rate and its accompanying reduction in the magnitude of the peak magnetic field produced at the load.

This invention may be briefly described as an improved construction for fast discharge high energy storage or power capacitors having minimal internal inductance and resistance characteristics and which does not require utilization of protective fuses for safety purposes when employed in large bank systems. In more particularity the herein described construction contemplates utilization of particularly patterned metallized dielectric media having self-healing properties and of a character capable of handling extremely high peak currents without electrode vaporization or burnout, wound in convolute form with interleaved dielectric media.

Among the advantages attendant the herein disclosed invention is the provision of a fast discharge high energy storage capacitor of minimal internal inductance and resistance characteristics that may be utilized in high energy storage banks without protective fuses and without danger of destructive explosions due to dielectric breakdown within individual capacitor sections. Another advantage of the herein described invention is the provision of a capacitor section of coaxial design having maximum energy storage density and increased longevity under most severe operating conditions and which is capable of handling extremely high peak currents without electrode vaporization or burnout. Still further advantages of the herein described capacitor construction are the ready provision of equal capacitance per series section, the permitted design of single section capacitors having voltage ratings from 2000 volts up to greater than 150,000 volts, higher ionization levels than can be obtained in conventionally designed units with consequent permitted higher operating stresses, discharge at higher frequencies and longer useful life.

The object of this invention is the provision of an improved construction for high energy storage capacitors.

Another object of this invention is the provision of an improved construction for fast discharge high energy storage capacitors having minimal internal inductance and resistance characteristics, reduced losses and greatly improved electrical characteristics.

Another object of this invention is the provision of an improved capacitor construction having self-healing and minimal impedance properties that permits utilization thereof for fast discharge high energy work without auxiliary external protective devices.

Other objects and advantages of the invention will be pointed out in the following portions of the specification and claims and will be disclosed in the accompanying drawings which illustrate, by way of example, the principles underlying the invention and a presently preferred embodiment of a capacitor section incorporating those principles.

Referring to the drawings:

FIG. 3 is a schematic exploded sectional view illustrative of the disposition of the windings of FIGS. 1 and 2 in a convolutely wound unit;

FIG. 4 is a schematic view illustrative of the series section arrangement of the electrode elements in an assembled unit;

FIG. 5 is a plan view of the preferred configuration for a termination plate adapted to be included in capacitors constructed in accordance with the principles described herein.

Figure 1:
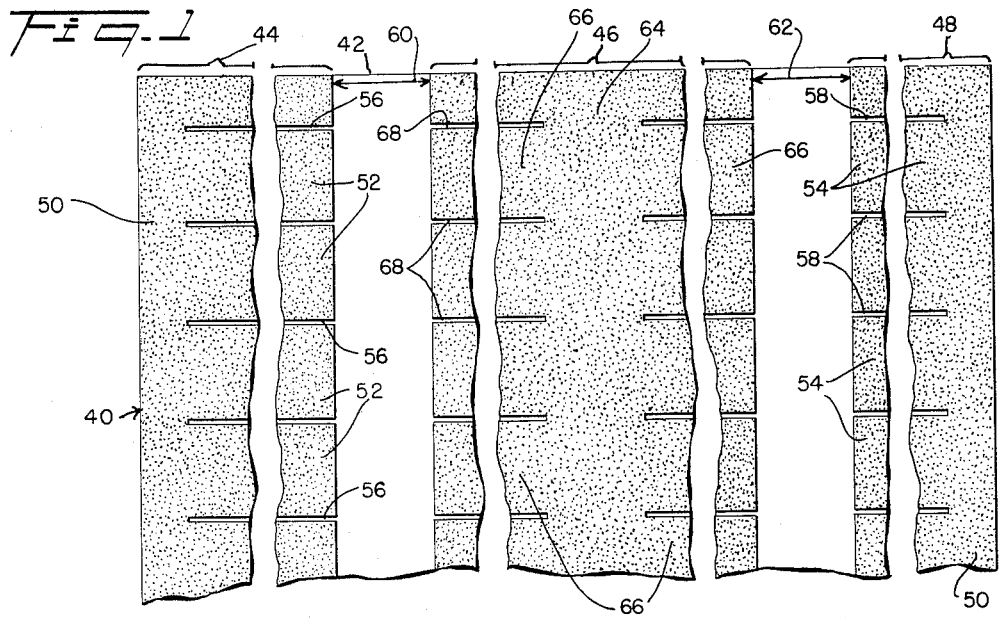
FIG. 1 is a plan view of a portion of one of the elongate particularly patterned metallized dielectric windings of a convolutely wound capacitor section incorporating the principles of this invention.
Figure 2:
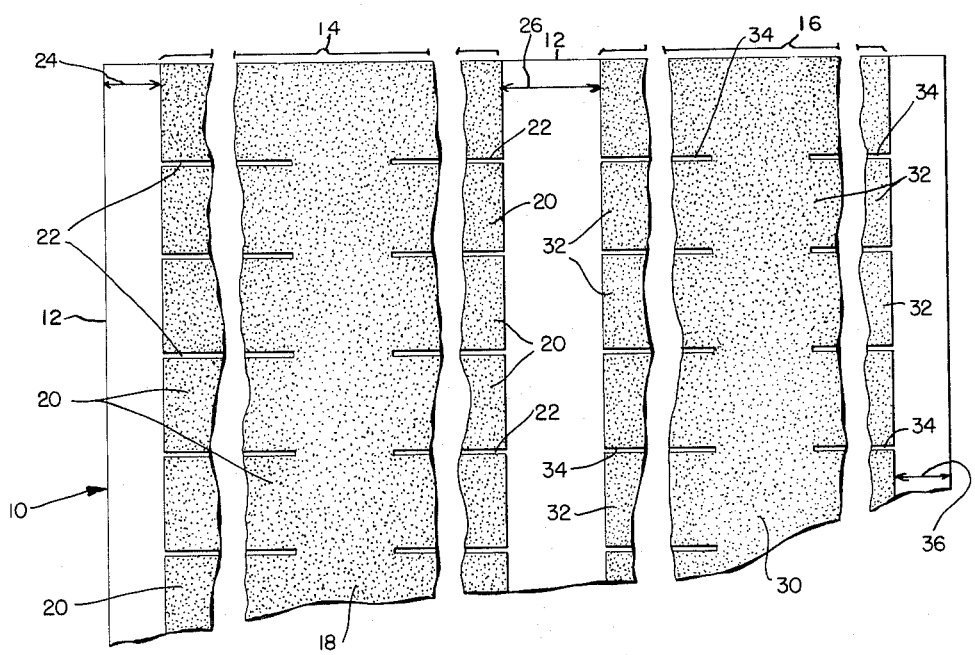
FIG. 2 is a plan view of a portion of a second particularly patterned metallized dielectric windings of a convolutely wound capacitor section incorporating the principles of this invention.

As indicated earlier, the subject capacitor construction is in the form of a convolutely wound section conventionally formed by winding elongate strips of particularly patterned and sized metallized dielectric media that serve as the electrode elements thereof with additional interleaved strips of dielectric material. FIGS. 1–3 illustrate, by way of example, the requisite proportioning and patterning of the metallized dielectric strips that has been found suitable for a particular size of capacitor, i.e., a 20 kv., 4 series section winding. As there illustrated, there is provided an elongate first electrode strip, generally designated 10, formed of dielectric media 12, suitably a high density, high quality kraft capacitor tissue having a pair of discrete patterned metallic conducting electrode films 14, 16 deposited thereon in intimate contact with the dielectric media surface. The patterned metallic electrode films, suitably zinc, are preferably about 60 millimicrons thick and are deposited in intimate contact with the surface of the dielectric media 12 by conventional vacuum deposition procedures that are well-known to those skilled in this art. FIG. 2 is illustrative of the preferred patterning of the electrode films 14, 16. As there shown, the electrode film 14 is patterned in the form of a comb having a continuous longitudinally disposed center section 18 and integral perpendicularly disposed rectangularly shaped teeth 20 extending transversely of the longitudinally disposed center section 18 on either side thereof and separated by interposed unmetallized spacing segments 22. The teeth 20 are sized to provide an unmetallized marginal portion of dielectric media along either side of the electrode 14 as indicated at 24 and 26. The electrode film 16 is preferably identical with the film 14 and includes a continuous longitudinally disposed center section 30, integral transversely extending rectangularly shaped teeth 32 separated by unmetallized segments 34 and bounded on either side thereof by unmetallized marginal portions 26, 36.

FIG. 1 is illustrative of the preferred metallization patterning of the second electrode strip, generally designated 40, formed of dielectric media 42 in FIG. 3 and suitably a high density, high quality kraft capacitor tissue. Three discrete patterned metallic conducting electrode films 44, 46, 18 are deposited on the dielectric material in intimate contact with the dielectric media by conventional and well-known methods. As there shown in FIG. 3, the width of the dielectric strip 42 is slightly greater than that of the dielectric backing strip 12 forming a portion of the first electrode strip 10. The terminal electrode films 44 and 48 are disposed adjacent the marginal edges of the dielectric strip 42 and, as best illustrated in FIG. 3, are of varying thickness, being thickest at the strip edge and gradually decreasing in thickness towards the center of the strip. This described metal build up for the marginal electrode film is essential to prevent metal vaporization at the extremely high peak currents, which may very well reach peak values of 300,000 amperes. Preferably, for the example capacitor herein being described for illustration purposes, the electrodes 48 and 44 are about 180 millimicrons thick at the marginal edge of the strip 42 and decrease, with a substantially uniform slope, to about 60 millimicrons at the inwardly disposed terminal edge thereof. It is of importance that the slope of the electrode films 44 and 48 be as uniform as possible, since any sharp discontinuity therein could, due to the very severe mechanical forces attendant peak current discharge, result in detrimental separation of the electrode film from the dielectric media. The electrode films 44 and 48 are continuous in nature along the marginal portion of the strip, as at 50, and are provided with integral inwardly directed rectangularly shaped teeth 52 and 54, respectively, extending transversely of the longitudinal axis of the strip 42 separated by interposed unmetallized spacing segments 56 and 58, respectively.

Disposed intermediate the terminal electrode films 44 and 48 and separated therefrom by unmetallized longitudinal strips 60 and 62, respectively, is an intermediate electrode film 46. As best shown in FIG. 1, the intermediate electrode film 46 is in the form of a comb having a continuous longitudinally disposed center section 64 and integral perpendicularly disposed rectangularly shaped teeth 66 extending transversely of the longitudinal axis of the dielectric strip 42 on either side thereof and separated by interposed unmetallized spacing segments 68.

As illustrated by the alignment of FIGS. 1–3, the electrode films 44, 46 and 48 are sized, in the transverse dimension, so that the unmetallized strips 60 and 62 of the second electrode strip 40 overlie the metallized center sections 18 and 30, respectively, of the electrode films 14 and 16 on the first electrode strip 10 in a convolutely wound unit and so that the metallized center section 64 of the intermediate electrode film 46 overlies the centrally disposed unmetallized center strip 26, of the first electrode strip 10.

FIG. 3 illustrates the laminar arrangement of the first and second electrode strips 10, 40 with a plurality of auxiliary interleaved dielectric strips in a convolutely wound section. Interposed intermediate the first and second electrode strips 10 and 40, respectively, are a plurality (specifically two in the illustrated example) of elongate strips of dielectric media 70, suitably high density, high quality kraft capacitor tissues, of a width equal to that of the dielectric strip 12 forming the base for the electrode films 14 and 16. A second pair of similar dielectric strips 72 are disposed adjacent the underside of the strips 12 so as to be interposed intermediate said strip and the upper surface of the electrode films 44, 46 and 48 in the convolutely wound unit.

By the above described arrangement, and as schematically illustrated in FIG. 4, effectively four series connected capacitors are included within a single convolutely wound section. These are schematically designated as section C–1 constituted by terminal electrode 44 and electrode 14, C–2 constituted by electrodes 14 and 46, C–3 constituted by electrodes 46 and 16 and C–4 constituted by electrode 16 and terminal electrode 48. The utilization of the illustrated series section arrangement in energy storage capacitors eliminates the numerous interconnections normally associated with capacitor designs having individual capacitor sections connected in series and hence provides a marked decrease in internal inductance and resistance and consequent improved fast discharge characteristics. Additionally, the illustrated utilization of series section arrangement facilitates provision of equal capacitance per series section with resultant proper voltage distribution and also eliminates the necessity for the use of equalizing resistors that are often employed in conventionally arranged series connected capacitor sections.

As will be apparent to those skilled in this art, any desired number of series section capacitors can be printed on a pair of dielectric strips and as such individual capacitors can be formed for voltage ratings from 3 kv. up to as high as 150 kv. and wound as a single section, being limited only by the electric width and the necessary metallizing facilities available to handle this width.

The utilization of metallized dielectric media as the electrode elements in the convolutely wound units advantageously utilize the well-known self-healing characteristics of such elements to provide for maximum energy storage density and extended operating life under severe operating conditions and, in addition, eliminates the need for fuses and protective devices in large banks and the undesired degradation of inductance associated therewith. The illustrated comb patterns markedly contribute to the inherent self-healing properties of metallized dielectric media. In a convolutely wound unit the current flow is normally axially directed. In contradistinction thereto the healing or clearing currents normally flow in a direction substantially perpendicular to the longitudinal axis of the wound unit. Without the desired combined comb pattern too much energy would be available for fault clearing purposes. The presence of the interposed unmetallized spacing segments 22, 34, and 68 serve to effectively present impedance to the flow of healing of fault clearing currents and, in conjunction, with the longitudinally disposed metallized collector lines 18, 30 and 64 provide for controlled self-healing of any faults in the electrode element assemblies.

As mentioned earlier, the width of the second electrode strip 40 is slightly greater than that of the first electrode strip 10 and the interleaved dielectric strips 70, 72. This size differential coupled with the increased thickness of the marginal portions of the terminal electrodes 44 and 48 disposed thereon results in a rolling over of the edge portions of the second electrode strip 40 when the assemblage is wound into a convolute section and in the presentation of an extended area metallized contact surface for terminal affixation purposes which materially contributes to the handling of very large peak current valves without burnout. Such terminal connections tend to short-circuit successive convolutions of electrode film 44 together, and to short-circuit successive convolutions of electrode film 48 together. However, the successive convolutions of each electrode film 14, 16 and 46 are not shortcircuited together and consequently there is an enforced lengthwise flow of current in these films in the fault-clearing process. This lengthwise current flow along any one film is limited in magnitude by the comb pattern, and still assurance is afforded of developing a potential difference at any given fault to bring the fault-clearing mechanism into play when required. This effect is more fully realized from the following discussion.

In the normal condition of the capacitor, equal voltages develop across capacitances C1, C2, C3 and C4. In the event of a breakdown or a fault of sharply localized character but of short-circuit proportions occurring from a point in one film to a point in the next film forming any one of these capacitances, there is nonetheless a tendency of this faulted capacitance to assume its share of the total voltage applied to the capacitances C1, C2, C3 and C4 in series. This tendency promotes flow of fault-clearing current. However, the magnitude of this current is held down to a non-destructive level under adverse fault conditions by virtue of the constrictions in the pattern in electrode films 14, 16 and 46. These electrode films which normally operate at potentials between the terminal potentials may be called "floating" electrode films. The effect of the film pattern in limiting the longitudinal flow of fault-clearing current is realized where one or more of such electrode films is provided. The effect of assuring minimum yet non-destructive fault-clearing current is most evident where two or more successive "floating" electrode films are included for establishing series capacitances.

Due to the extremely high peak currents utilized in energy storage capacitors of the type described herein and the necessity for maintaining fast discharge characteristics, it is desirable that the termination assembly be of a minimal inductance character. To this end, no flexible tabs or wiring should be used, all current carrying parts should be of a rigid and smooth nature and without any sharp discontinuities in the direction of the current flow. To this end, termination plates of the type illustrated in FIG. 5 are preferred. As there illustrated, the termination plate is in the form of a spider having a plurality of leg elements 80 radially disposed about a central section 82. In assembling a unit, the extended area metallized contact surfaces of a convolutely wound section, constructed in accordance with the principles described herein, are masked in the same configuration as the termination plate and sprayed, preferably with a tin-lead spray, to provide an essentially solid and continuous metallic contact area 84 thereon. The termination plate, whose outer periphery is sized to approximately the diameter of the convolutely wound capacitor section, is placed in abutting relation against the sprayed contact surface at the end of the convolutely wound section and is swaged or soldered or otherwise secured thereto to provide a firm and secure electrical and mechanical connection therebetween. An identical termination 80', 84' is applied at the opposite end of the wound unit. Utilization of the described termination plate provides for radial current flow and minimizes termination inductance. The unit is then preferably given an initial impregnation and, subsequent thereto, is given an initial clearing to clear any inherent faults therein. A single unit or a plurality thereof are there assembled in a container and the termination assembly is completed and is followed by the usual drying and impregnation operations well-known to those skilled in this art. The detailed construction of a preferred and improved termination assembly for energy storage capacitors of the type herein of particular concern are disclosed in my copending application Serial No. 749,897 filed July 21, 1958, now Patent No. 3,024,393 issued March 6, 1962, and in the interests of brevity, will not be here repeated.

Figure 6:
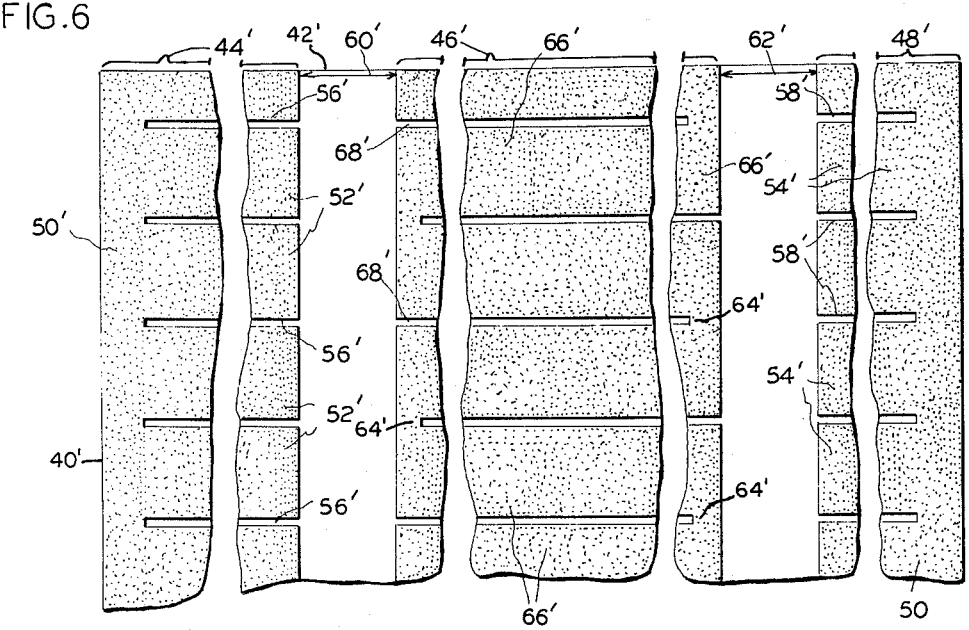
FIGS. 6 and 7 are views corresponding to FIGS. 4 and 5 of a modification.
Figure 7:
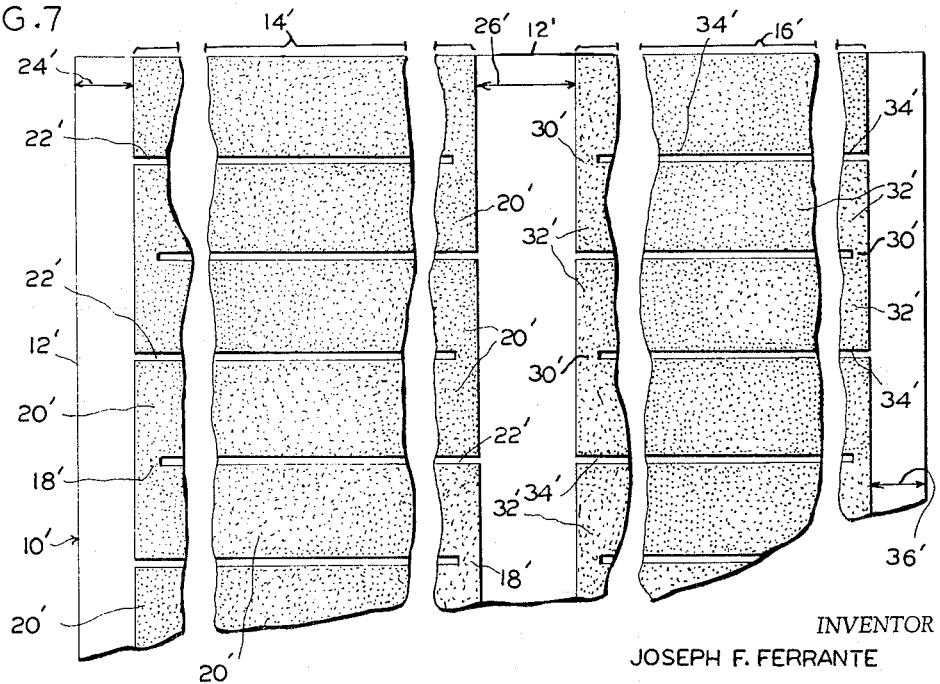

A modification is illustrated in FIGS. 6 and 7 which achieves the objects and advantages of the foregoing embodiment through the use of a film pattern differing somewhat from the film pattern in FIGS. 4 and 5. The description of the parts of FIGS. 6 and 7 is omitted, it being understood that the parts in FIGS. 6 and 7 bearing primed numerals are the same as the corresponding parts in FIGS. 4 and 5 bearing unprimed numerals with the following exceptions.

Floating electrodes 14', 16' and 46' lack the center portions 18, 30 and 64 that interconnect the film areas defined by incomplete transverse interruptions 22, 34, and 68. Instead, the successive incomplete transverse interruptions 22', 34' and 68' extend from alternate edges of their respective films leaving connections 18', 30' and 64' between the successive film areas 20', 32' and 66'. The latter are thus longitudinally interposed as current paths in series with connections 18', 30' and 64'. This pattern represents a longer and more inductive path limiting the flow of fault-clearing current or, in the alternative, involves fewer transverse interruptions for the same current-limiting effect as in the pattern of FIGS. 4 and 5. In all instances, however, the normal flow of capacitive charging and discharging current is essentially axial, and is not affected by the pattern described.

As will be apparent to those skilled in this art, the inventive principles set forth and disclosed herein may be advantageously employed and utilized in the fabrication of energy storage and power capacitors of almost any desired capacitance and rating. Capacitors constructed in accordance with this disclosure may be advantageously utilized in the above-mentioned thermonuclear research field as well as for other applications such as wind tunnels, hard pulse tube modulators, plasma generators, certain high voltage D.C. applications and others.

Having thus described my invention, I claim:

1. In a convolutely wound fast discharge, high energy storage capacitor unit, a first elongate strip of dielectric media, a pair of continuous longitudinally disposed metallized load carrying terminal electrode elements deposited thereon along the marginal edges thereof, said load carrying terminal electrode elements being of graduated thickness, decreasing with a substantially uniform slope from a maximum thickness adjacent said marginal edges to a minimum thickness at locations spaced inwardly thereof and defining an intermediate unmetallized area running longitudinally of said strip, a second elongate strip of dielectric media having a continuous longitudinally disposed metallized electrode element of substantially uniform thickness deposited thereon and sized, when convolutely wound with said first dielectric strips to electrically overlap portions of said terminal electrode elements and form a series section capacitor, said continuous longitudinally disposed metallized electrode element having numerous transverse incomplete interruptions providing a path therealong for fault-clearing currents, said current path being of greatly increased impedance compared with the impedance of a like metallized-film electrode not having such transverse interruptions.

2. An electrical capacitor including a succession of elongated dielectric convolutely wound strips and at least four electrodes thereon and thus also convolutely wound and arranged to constitute series capacitances, said electrodes including a pair of terminal electrodes each having terminal means at a respective edge thereof short-circuiting successive convolutions together and at least two floating electrodes electrically interposed between the said terminal electrodes, said floating electrodes being in the form of elongated metallized films on and extending along at least one of said dielectric strips, said floating electrodes having numerous transverse incomplete interruptions providing a current path along each such film of greatly increased impedance compared with the impedance of a like metallized-film electrode not having such transverse interruptions.

3. An electrical capacitor including a series of elongate electrodes confronting one another in succession and a plurality of dielectric layers interposed between and separating said electrodes from each other as to constitute capacitances in series, said electrodes being convolutely wound and including a pair of terminal electrodes the edges of each of which are short-circuited together and form terminals of the capacitor and at least one floating electrode interposed between said terminal electrodes in the form of a metallized film having transverse incomplete interruptions providing a longitudinal current path of greatly increased impedance compared with the impedance of a like metallized-film electrode not having such transverse interruptions.

4. An electrical capacitor in accordance with claim 3 wherein said terminal electrodes are a pair of metallized films both disposed on one of said dielectric layers along the longitudinal edges thereof and said terminal electrodes being of progressively decreasing thickness across the dielectric strip from a maximum thickness adjacent each marginal edge to a minimum thickness at a location spaced inwardly of such edge.

References Cited by the Examiner

UNITED STATES PATENTS

| | | | |
|---|---|---|---|
| 1,899,176 | 2/1933 | Bailey | 317—261 |
| 3,014,167 | 12/1961 | Winter et al. | 317—258 |

FOREIGN PATENTS

| | | |
|---|---|---|
| 125,249 | 8/1947 | Australia. |
| 867,888 | 2/1953 | Germany. |
| 931,478 | 8/1955 | Germany. |
| 398,473 | 1/1932 | Great Britain. |
| 480,713 | 2/1938 | Great Britain. |
| 728,566 | 4/1955 | Great Britain. |

ROBERT K. SCHAEFER, *Primary Examiner.*

JOHN F. BURNS, LARAMIE E. ASKIN, E. JAMES SAX, *Examiners.*

D. J. BADER, *Assistant Examiner.*